(12) United States Patent
Hochegger et al.

(10) Patent No.: US 10,329,176 B2
(45) Date of Patent: Jun. 25, 2019

(54) METHOD AND DEVICE FOR DEWATERING SLUDGE ON A SCREEN

(71) Applicant: Andritz AG, Graz (AT)

(72) Inventors: Ursula Hochegger, Graz (AT); Christoph Spielmann, Hitzendorf (AT)

(73) Assignee: Andritz AG, Graz (AT)

( * ) Notice: Subject to any disclaimer, the term of this patent is extended or adjusted under 35 U.S.C. 154(b) by 276 days.

(21) Appl. No.: 15/305,234

(22) PCT Filed: Apr. 13, 2015

(86) PCT No.: PCT/EP2015/057947
§ 371 (c)(1),
(2) Date: Oct. 19, 2016

(87) PCT Pub. No.: WO2015/162024
PCT Pub. Date: Oct. 29, 2015

(65) Prior Publication Data
US 2017/0044034 A1    Feb. 16, 2017

(30) Foreign Application Priority Data

Apr. 23, 2014 (AT) ..................... 291/2014

(51) Int. Cl.
*C02F 1/52* (2006.01)
*C02F 11/121* (2019.01)

(52) U.S. Cl.
CPC .......... *C02F 1/5209* (2013.01); *C02F 11/121* (2013.01); *C02F 2303/24* (2013.01)

(58) Field of Classification Search
CPC ....................................................... C02F 1/52
See application file for complete search history.

(56) References Cited

U.S. PATENT DOCUMENTS 4,105,558 A * 8/1978 Heinrich ............... B01D 21/01
                                                      210/199
5,380,440 A * 1/1995 Chipps ............... B01D 21/0012
                                                      210/709

(Continued)

*Primary Examiner* — Peter Keyworth
(74) *Attorney, Agent, or Firm* — Alix, Yale & Ristas, LLP

(57) ABSTRACT

The invention relates to a method for the dewatering of sludge on a screen, wherein a flocculant is admixed with sludge, whereafter the sludge is at least partially dewatered, the flow behavior of the sludge on the screen being optically detected and the amount of flocculant to be admixed being set according to the free screen surface in a control region. The invention is primarily characterized in that the control region is arranged at a point of the cleaned screen in the inlet area of the sludge, for example at the edge. The invention also relates to a device for the dewatering of sludge, comprising a flocculant feed device and a screen downstream of the flocculant feed device, wherein a device, in particular a camera, is provided for optically detecting the flow behavior of the sludge and is connected via a control system to the flocculant feed device for regulating the amount of flocculant, said device being characterized in that the device (11), in particular the camera, is designed such that it detects a control region in the inlet area (10) of the cleaned screen. In this way, regulation can be achieved for an optimal feed amount of flocculant in a straightforward manner regardless of the material feed and the sludge type.

18 Claims, 3 Drawing Sheets

(56) References Cited

U.S. PATENT DOCUMENTS 5,961,827 A * 10/1999 Bahr .................... B01D 29/096
　　　　　　　　　　　　　　　　　　　　　　　100/118
2007/0090060 A1　　4/2007　Clark
2009/0230033 A1*　9/2009　Bowers, Jr. ........... C02F 1/5209
　　　　　　　　　　　　　　　　　　　　　　　210/85

* cited by examiner

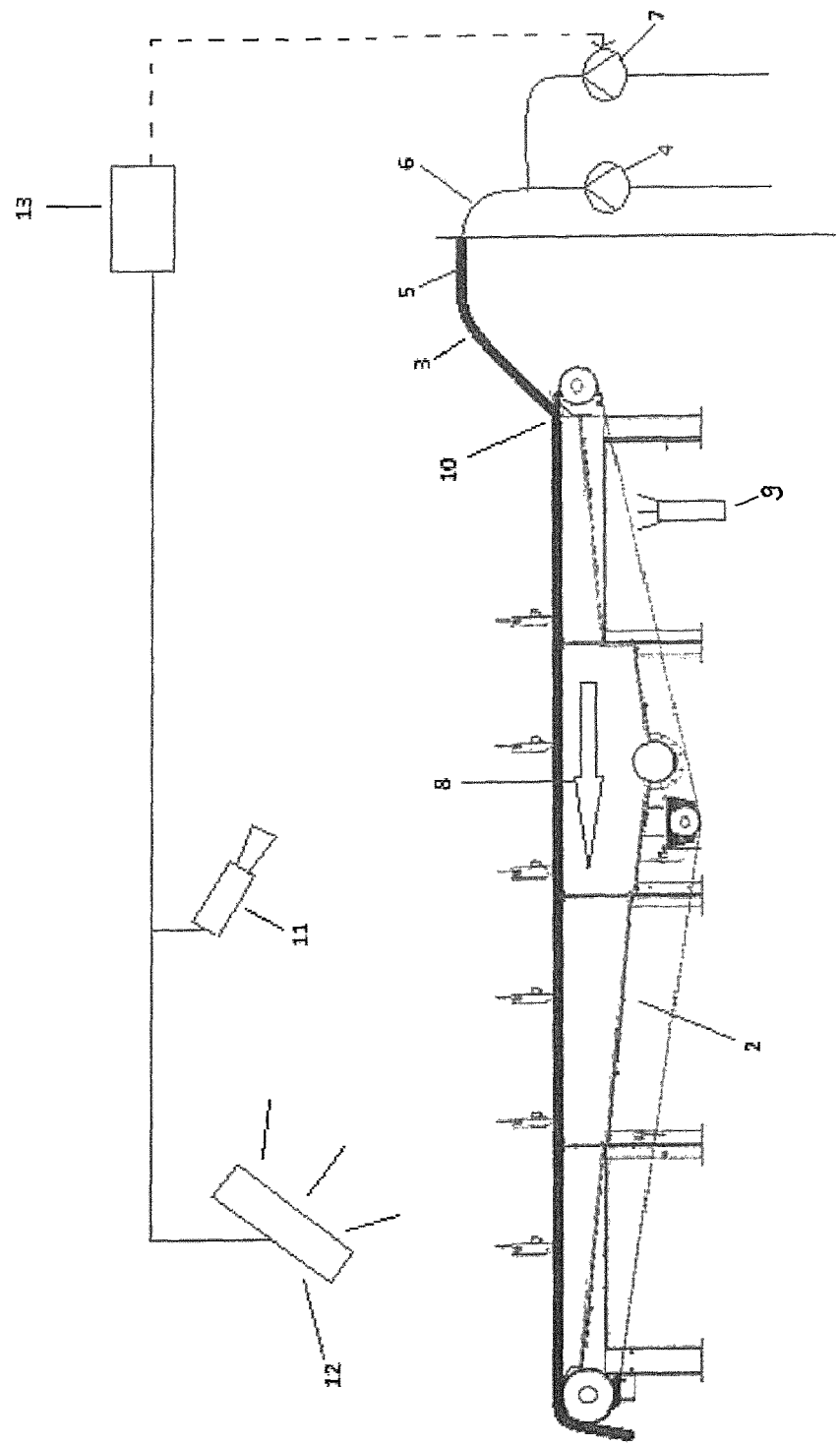

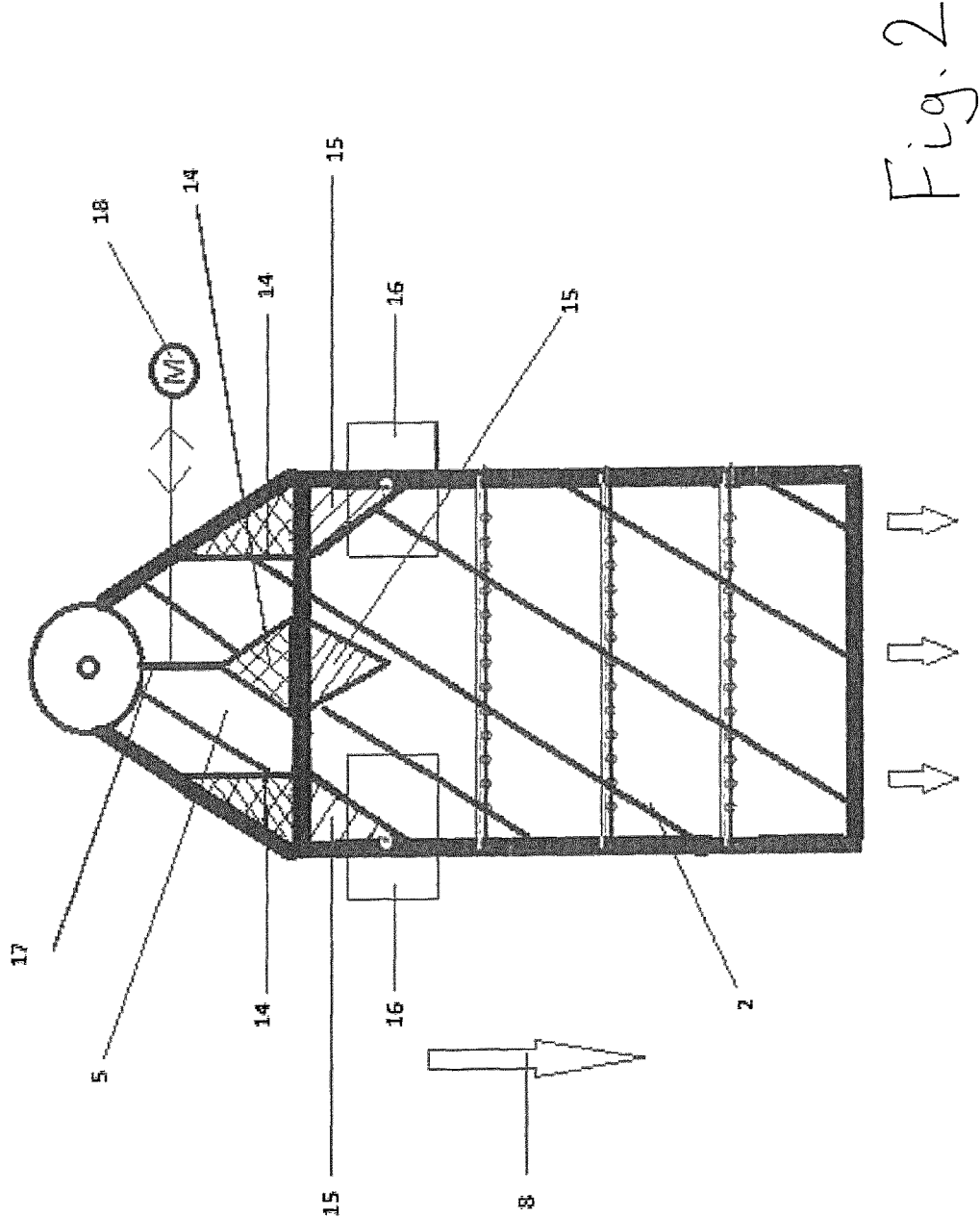

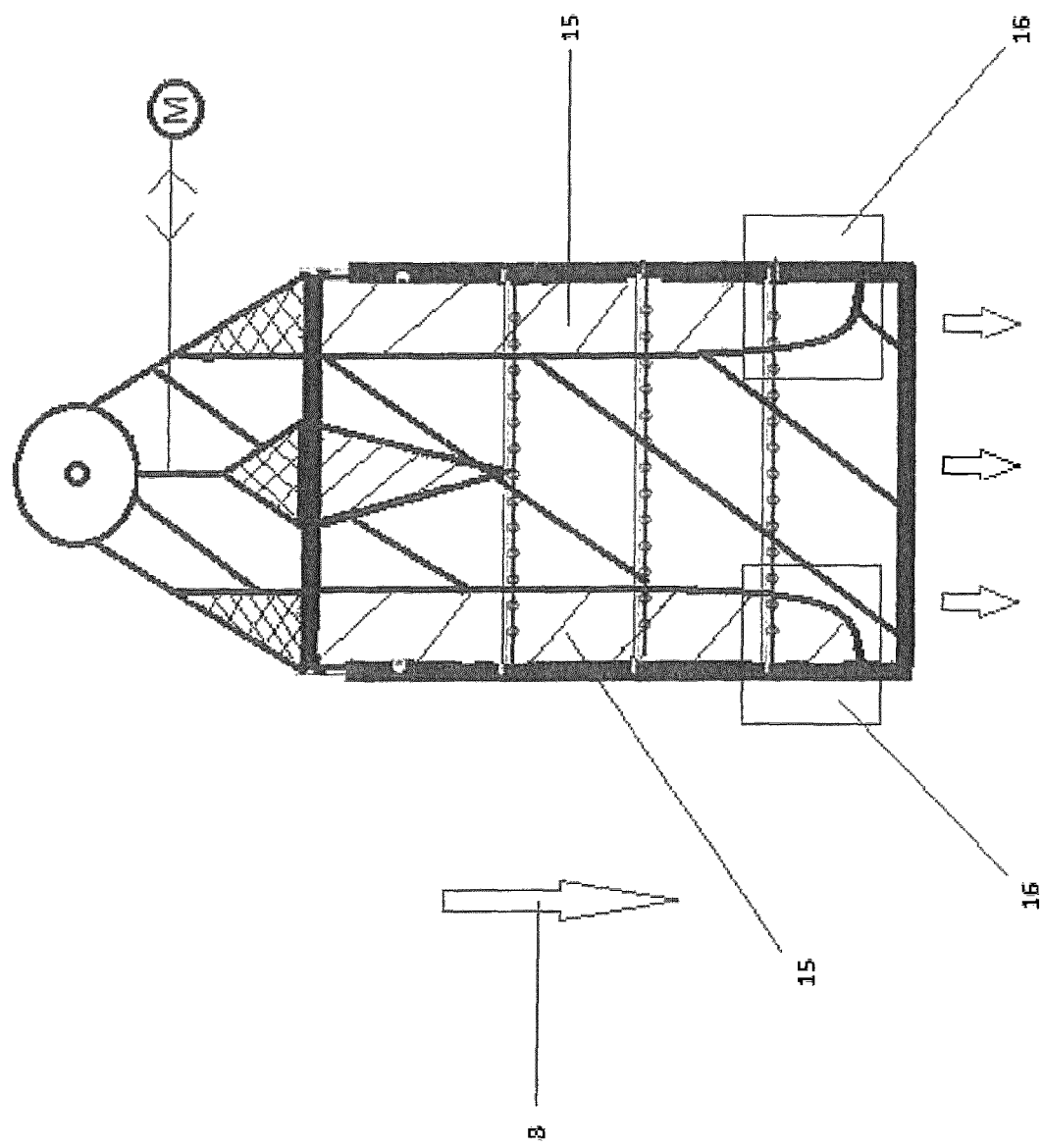

METHOD AND DEVICE FOR DEWATERING SLUDGE ON A SCREEN

BACKGROUND

The invention relates to a method for dewatering sludge on a wire, which is cleaned by washing nozzles and subsequently enters the sludge inflow area, where a flocculant is added to a sludge and the sludge is then at least partially dewatered, during which the rheological properties of the sludge on the wire are scanned optically and the amount of flocculant to be added is set according to the free surface area of the wire in a control zone. It also relates to a device for dewatering sludge, with a flocculant feed device and a wire, which is cleaned by washing nozzles before entering the inflow area, arranged after the flocculant feed device, where a device, especially a camera, is provided in order to scan the rheological properties of the sludge optically and is connected via a control system to the flocculant feed device in order to control the flocculant dosage added.

Methods for dewatering sludges are known from the state of the art, where sludges such as sewage or fibrous sludge are dewatered with flocculant added. Here, the flocculant is added to the sludge in a first stage in order to cause the sludge to flocculate, after which the sludge is applied to a wire, on a gravity table for example, so that the liquid in the sludge drains off through the wire, while dry sludge flocks remain on the wire. This causes the sludge to be dried or dewatered, respectively.

In methods of this kind, flocculant dosage is an important parameter. On the one hand, a desired dry content can only be achieved with the right dosage because too much or too little flocculant both have a negative effect on the efficiency of the dewatering or screening process. On the other hand, the flocculant itself entails costs, so adding too much flocculant also makes the method more expensive.

Normally, the amount of flocculant added to the sludge is set manually by the operating personnel, who assess the flocculation status of the sludge visually. However, this makes considerable demands on the operating personnel, both in terms of their ability to judge the correct flocculation status and of their perseverance and vigilance. Thus, an operator often cannot tell whether dewatering performance can be improved by increasing or by reducing the flocculant dosage because both too much and too little flocculant will result in poorer dewatering efficiency. Correct flocculant dosage is difficult to achieve in the result of state-of-the-art methods, which means that the processes are not run at the optimum operating point in most cases, with the result that the methods only achieve low dewatering performance or high flocculant consumption.

Automated methods are known, e.g. according to U.S. Pat. No. 5,380,440, where a visual signal from the surface of a wet solids layer on a belt is recorded and compared with a pre-set value for moisture content. It is possible here to achieve optimum flocculant consumption for dewatering to a certain moisture content at a specific point on the belt, but not to the optimum or minimum moisture content. In addition, a system is known from US 2007/0090060 that considers a control zone located after the dewatering ploughs for improving dewatering. Due to fouling of the belt and the uneven flow behaviour of the individual sludges, a high flocculant dosage is needed here primarily in order to see the desired streaks as the basis for measurement. As a result, the measurement is severely distorted and inaccurate and cannot result in a minimum flocculant dosage.

SUMMARY

The aim of the invention is thus to disclose a method of the type mentioned at the beginning, in which correct flocculant dosage is guaranteed and with the result that optimal dewatering performance is achieved and can also be reproduced.

The invention is thus characterized in that the control zone is established at a location of the cleaned wire in the sludge inflow areas region of the machine, preferably adjacent the edge of the wire.

The invention is thus characterized in that the control zone is established at a point on the cleaned wire in the sludge inflow area, for example at the edge.

By measuring the free surface area of the wire, it is possible to obtain an objective value for the rheological properties of the sludge that is used to set or change the flocculant dosage.

Thus, there is no real need for error-susceptible assessment of the flocculation status by the operating personnel in order to adjust the flocculant dosage, with the result that optimum dewatering performance is achieved in economical operations due to the correct flocculant dosage being used in the process. The dewatering performance indicates the volume of liquid that is removed from the sludge per unit of time during the process. In addition, the method according to the invention can also be performed automatically because the change measured in the free surface area of the wire provides a process variable that can be measured objectively and incorporated into a control system for a flocculant feed device. An increase in the free surface area of the wire indicates that the flocculant dosage is too high and can be reduced automatically. The optimum flocculant dosage is achieved when a pre-set value for the free surface area of the wire is reached, i.e. when the rheological properties of the sludge are such that the wire is not flooded and the dewatering device can thus be operated without any problems. As the wire in the inflow area has been cleaned, the free surface area of the wire can be determined reliably without being influenced by the sludge to be dewatered because the free surface area of the wire always displays the same (color) data.

An advantageous development of the invention is characterized by the sludge being a municipal, mineral, or fibrous sludge. With these sludges in particular, a flocculant is used for dewatering purposes, the quantity of which can be optimized in this way.

If the control zone is set up downstream of barriers, especially movable barriers, in the inflow area, a control zone with a cleaned, free wire surface area can always be established, depending on the sludge and the design of the inflow area, where the rheological properties of the sludge and hence, the proportion of free wire surface area change significantly when the flocculant dosage is altered, thus resulting in a stable control system.

A favourable development of the invention is characterized in that a camera, especially a digital camera, scans the control zone continuously and the free surface of the wire, i.e. the surface area not covered with sludge, is measured by means of a pixel analysis, applying a color criterion. This makes it very easy to distinguish between areas with and areas without sludge.

A favourable embodiment of the invention is thus characterized in that the flocculant dosage added is set such that the proportion of free wire surface area can be maintained constant in the control zone. Thus, the optimum operating point is always set and the machine can be operated without any difficulties, e.g. due to flooding as a result of there not being enough flocculant.

A favourable development of the invention is characterized in that the initial value for controlling the flocculant dosage is changed by altering the flocculant dosage in large steps, and if there is a deterioration, i.e. a reduced free surface area, it is altered in smaller steps in the opposite direction. In this way, it is possible to reach an optimal operating point, even if the setting procedure begins at a point where the flocculant dosage is much too high. In this case, an increase in the flocculant dosage would lead again to a deterioration in dewatering performance, thus causing the flocculant dosage to be reversed, i.e. reducing the flocculant quantity.

The invention also relates to a device for dewatering sludge, with a flocculant feed device and a wire disposed after the flocculant feed device, where a device, especially a camera, is provided in order to scan the rheological properties of the sludge optically and is connected via a control system to the flocculant feed device in order to control the flocculant dosage.

According to the invention, it is characterized in that the device, especially a camera, is set up so that it scans a control zone in the inflow area of the cleaned wire. By using a camera, especially a digital camera, it is very easy to scan a control zone, and the measuring result can be used to control the flocculant dosage via a control routine.

If the device, especially a camera, is arranged movably above the wire, it is always possible to set an optimal control zone, depending on the design of the inflow, and also to adjust it again if there are major changes.

A favourable development of the invention is characterized in that the device, especially a camera, is set up so as to scan a control zone in the inflow area. As the wire is still in a cleaned state in the inflow area, scanning is particularly reliable here, providing a stable control system.

An advantageous embodiment of the invention is characterized in that barriers are provided in the inflow area, where the barriers can be movable. Here, the control zone is set up after the barriers, especially movable barriers, in the inflow area so that it can always be used to create a control zone with a free wire surface, depending on the sludge and the design of the inflow area, where the rheological properties of the sludge and hence the proportion of free wire surface area change significantly when the flocculant dosage is changed, thus resulting in a stable control system.

An advantageous development of the invention is characterized in that a slide, especially an adjustable slide, is provided in the center of the wire when viewed in cross-machine direction and in that this slide can be secured, for example, to a barrier arranged in the center of the wire. This can be used to achieve symmetrical distribution of the sludge in the inflow area and thus also symmetrical distribution of free wire surface areas at the left-hand and right-hand edges of the wire, which are configured as control surfaces. In principle, there may be several control surfaces, and the total area of these surfaces is used for the purposes of the control system. This can be an advantage, particularly if sludge distribution is not symmetrical. With an adjustable slide, symmetrical distribution can also be set if necessary automatically during operation.

BRIEF DESCRIPTION OF THE DRAWING

The invention will now be described in examples and referring to the attached drawings, where FIG. 1 shows a plant according to the invention, FIG. 2 shows a top view of a plant according to the invention, and FIG. 3 shows a top view of a plant according to the invention as shown in FIG. 2, but with a modified inflow area and control zone.

DETAILED DESCRIPTION

FIG. 1 shows a dewatering plant 1 according to the invention, which is shown here as a simple gravity table with a wire 2. For larger amounts of water, an additional tray and discharge can be provided, where the wire 2 can be guided round an additional roll if necessary. The invention can also be used in the gravity zones of twin wire presses, for example. The sludge 3 is fed to a headbox 5, which is designed here as a chute, by means of a sludge pump 4. The amount of flocculant required is added in the sludge feed pipe 6 by means of a flocculant pump 7. The wire 2 running in direction 8 is cleaned by washing nozzles 9 before entering the inflow area 10. The sludge 3 is then fed onto the cleaned wire 2. A control zone is scanned by a camera 11 in the inflow area 10. Lighting 12 is provided to enhance scanning. The camera 11 is connected to the flocculant pump 7 via a control system 13 so that the flocculant dosage can be controlled by the signals from the camera 11.

FIG. 2 contains a top view of a plant according to the invention. It provides a view of the wire 2, which is largely covered with sludge 3. A sludge pump 4 and the headbox 5 are shown here schematically, where the headbox can be designed as an open, inclined chute or may also have an enclosed design. The sludge 3 is distributed over the width of the wire via the headbox. Barriers 14 are also visible here, which then form free wire surface areas 15 in machine running direction 8, depending on the type of sludge and the headbox design. The barriers 14 can be formed very simply by suitably shaped pieces of sheet metal. The free wire surface areas 15 are cleaned beforehand by washing nozzles (not shown here) and thus offer a good and even base on which to scan and measure the free surface area of the wire. In the present example, the control zone 16 would include a part of the free wire surface area 15 and another part on which there is sludge. In this control zone 16, the difference in color between the sludge and the wire surface area without sludge is scanned, with each of the two criteria being assigned to one color spectrum. Subsequently, the individual pixels are counted according to the color criterion, and the area of the sludge and of the wire surface area free of sludge are calculated. The advantage of the control zone 16 in the inflow area 10 is a permanently stable and robust scan. In addition, it is easy to detect any asymmetrical distribution of the sludge. This can be detected particularly well by using two separate and symmetrical control zones 16 (as shown). Sludge feed can be set to be symmetrical by means of a slide 17, and distribution can be corrected by an automatic control device using an actuator 18.

The six devices above the wire in FIG. 1 (which corresponds to three devices in FIGS. 2 and 3) are bars across the width of the wire at which so called ploughs are mounted. These ploughs reach to the surface of the wire and turn the sludge to give more open areas and to facilitate dewatering by gravity. With the present invention, the control zone is located upstream of all the ploughs. The control zone should preferably be on a side of the wire, adjacent the edge, where the sludge ends to flow to, dependent on the properties (e.g. concentration of solids, which is very low here). The idea is to have a clean surface of the wire as background with a defined color so that any sludge with a different color can be distinguished properly. The chosen position has a clean wire, which will be the same, consistent color instead of undefined colors as in the prior art.

FIG. 3 shows an analogous arrangement according to the invention as in FIG. 2, however with a modified inflow area 10' and with control zones 16' in an offset arrangement in machine running direction 8. This case can occur with thinner sewage sludges in particular, which are fed in at higher speed. In this case, the free and cleaned wire surface area 15' remains so for longer and the sludge 3 does not flow onto the peripheral areas until later. Here, too, a clear relation is visible between the free wire surface area 15' and the area with a covering of sludge, and this can be used to derive a control variable for flocculant dosing. The risk of the wire being flooded due to the sludge consistency being too thin can also be detected here at an early stage and prevented by increasing the flocculant dosage. Optimum control using a minimum of flocculant can thus be achieved in these cases as well.

The invention is not limited to the examples shown, but can also be used in the gravity zones of twin wire press plants, for example, in addition to use in gravity tables. Besides municipal and sewage sludge, this application can also be used with mineral and fibrous sludges. Although the conditions are different here, particularly the rheological properties of the sludges and due to the flocculants used, it is always possible to find a suitable control zone in which the sludge flows towards the edges with low flocculant consumption and onto the free surface area of the wire that is still clean. The location of the control zone can also be changed, and this is often necessary if the headbox has a different design. However, a control zone that has proven to be optimal, and thus also the arrangement of the camera and lighting, no longer need to be changed. Thus, this can be set easily during start-up, and no further setting is needed in future operations.

The invention claimed is:

1. Method for dewatering sludge that passes through a machine feed region to a headbox and is then deposited at an inflow region of the machine onto a clean wire that has been cleaned by washing upstream of the inflow region, thereby producing a distribution of sludge-covered and at least one free surface area without sludge on the wire in the inflow region, with the method further including adding a dosage of flocculant to the sludge before the sludge is deposited on said wire, and wherein the rheological properties of the sludge on the wire are scanned optically and the amount of flocculant to be added is set according to the free surface area of the wire in a control zone, wherein the improvement comprises that the control zone is established on the wire in the inflow region that follows washing of the wire, and
wherein the headbox has a reduced cross-section in the inflow region thereby forming the at least one free wire surface area without sludge on the wire.

2. Method according to claim 1, wherein the sludge is a municipal, mineral, or fibrous sludge.

3. Method according to claim 1 wherein the control zone is set up after barriers that laterally distribute sludge on the wire in the inflow region.

4. Method according to claim 1 wherein the control zone is set up after a reduced cross-section flow area of sludge from the headbox into the sludge inflow region.

5. Method according to claim 1, wherein a digital camera scans the control zone continuously and the free surface of the wire is measured by a pixel analysis, applying a color criterion.

6. Method according to claim 1, wherein the flocculant dosage added is set such that the proportion of free wire surface area is maintained constant in the control zone.

7. Method according to claim 1, wherein an initial flocculant dosage is increased or decreased by altering the flocculant dosage in large steps, in response to a resulting reduced free surface area, the dosage is altered in smaller counter steps.

8. Method according to claim 1, wherein the wire has lateral edges and the control zone is established at a location on the wire adjacent the edge of the wire.

9. Method according to claim 8, wherein the control zone is set up after barriers in the inflow region and the barriers laterally distribute sludge on the wire in the inflow region toward the control zone.

10. Device for dewatering sludge, including a flocculant feed device and a wire arranged after the flocculant feed device, washing nozzles (9) for cleaning the wire upstream of a dewatering inflow region (10) where sludge is deposited on the cleaned wire from a headbox (5), a camera (11) provided to scan the rheological properties of the sludge optically and a control system (13) connected to the camera and to the flocculant feed device (7) to control a flocculant dosage, wherein the improvement compromises that the camera is set up to scan a control zone of the cleaned wire in the dewatering inflow region (10) that follows the washing nozzles (9) that clean the wire, and
wherein the headbox has a reduced cross-section in the inflow region thereby forming the at least one free wire surface area without sludge on the wire.

11. Device according to claim 10, wherein the camera, is arranged moveably above the wire.

12. Device according to claim 10, wherein the camera, is a color camera.

13. Device according to claim 10, wherein barriers (14) are provided in the inflow region (10).

14. Device according to claim 13, characterized in that wherein the barriers (14) are designed so as to be movable, especially in machine direction.

15. Device according to claim 13 wherein an adjustable slide (17) is provided in the center of the wire (2) when viewed in cross-machine direction and said slide (17) can be secured to a barrier (14) arranged in the center of the wire (2).

16. Device according to claim 10, wherein the wire has side edges and the control zone is adjacent a side edge.

17. Device according to claim 10, wherein the machine includes at least one plough across the wire for redistributing the sludge, and the control zone is upstream of all the at least one plough.

18. Device according to claim 12, wherein the control zone of the cleaned wire in the dewatering inflow region (10) has local areas of washed wire interspersed with local areas of sludge; the camera senses all said local areas of washed wire in the control zone as a consistent background color; and the camera senses all said local areas of sludge in the control zone as different foreground colors.

\* \* \* \* \*